United States Patent Office 2,779,749
Patented Jan. 29, 1957

2,779,749

STABILIZED UNSATURATE-SO₂ RESINS CONTAINING ACRYLATES

John E. Wicklatz, Bartlesville, Okla., assignor to Phillips Petroleum Company, a corporation of Delaware No Drawing. Application September 29, 1952, Serial No. 312,166

13 Claims. (Cl. 260—79.3)

This invention relates to resins obtained by the polymerization of unsaturated organic compounds with sulfur dioxide. In one aspect it relates to a process and a product of copolymerization of an acrylate with another unsaturated compound and sulfur dioxide. In a further aspect it relates to the production of a thermally stable resin from an unsaturated hydrocarbon and sulfur dioxide and the product resins so obtained.

The production of resins by copolymerizing sulfur dioxide and an unsaturated compound such as an olefin has been known for a number of years. The present invention is directed to a process for the heat stabilization of such a resin and the stabilized resin so produced.

According to this invention a thermally stable resin is produced by copolymerizing sulfur dioxide, an unsaturated organic non-acrylate compound, such as an unsaturated hydrocarbon, and an alkyl acrylate under copolymerizing conditions and recovering a thermally stable resin.

The unsaturated compound used as a starting material is preferably an unsaturated hydrocarbon such as an open-chain or cyclic olefin, a diolefin or an acetylene. Olefins suitable as starting materials are normal butenes, pentenes, octenes, cyclohexene, methylcyclohexene, and 4-cyclohexyl-1-butene. Substituted olefins, such as styrene, can also be used. Suitable acetylenes are acetylene and methylacetylene. Suitable diolefins are 1,3-butadiene, pentadienes and hexadienes. Unsaturated alcohols and unsaturated halides, e. g. vinyl alcohol and allyl chloride, can also be employed as the non-acrylate compound.

The acrylate used as a stabilizing ingredient according to this invention is an alkyl ester of acrylic acid in which the alkyl radical has from 1 to 10 carbon atoms. The alkyl radical is ordinarily a straight-chain radical although branch-chain radicals can be employed. Examples of suitable acrylates are methyl acrylate, ethyl acrylate, butyl acrylate, octyl acrylate and decyl acrylate.

The copolymerization reaction is conducted in accordance with the techniques known in the art. The ingredients previously described can be copolymerized in homogenous solution such as an acetone or a hydrocarbon solution or they can be polymerized according to the technique of emulsion polymerization of Crouch and Cotten, Serial No. 8,755, filed February 16, 1948. According to this type of polymerization the ingredients to be polymerized are dispersed in a fluid medium such as water with the addition of a surface-active agent or emulsifier, and are subjected to copolymerization conditions of time and temperature. After the completion of the copolymerization reaction, the product is coagulated by the addition of methanol or an ionizing salt such as sodium chloride, magnesium sulfate, or potassium sulfate. The material thus coagulated is recovered and can be subjected to molding or compression to obtain the desired shape. As disclosed in application Serial No. 275,471, filed March 7, 1952, a small amount of a metal alkyl dithiophosphate can be added to obtain increased stability toward heat.

A catalyst is preferably used to effect the copolymerization. Suitable catalysts or activators are oxidizing agents such as potassium persulfate, hydrogen peroxide, peracetic acid, and nitric acid, organic peroxides such as tertiary butyl hydroperoxide and benzoyl peroxide, and nitrates of the alkali metals and ammonium.

The temperature of copolymerization is in the range 0 to 150° F., preferably 40 to 120° F., and more preferably 80 to 110° F. The reaction time is in the range 1 to 20 hours, preferably 5 to 8 hours. The pressure must be sufficient to maintain the reaction mixture substantially completely in the liquid phase.

The amount of acrylate used in the starting mixture is in the range 1 to 20 mol percent based on the total amount of acrylate plus other unsaturated compounds, e. g. hydrocarbon, present in the mixture. A more preferred range is 2 to 10 mol percent. The mol ratio of sulfur dioxide to unsaturated hydrocarbon is preferably at least 1 to 1, more preferably in the range 1:1 to 10:1, and still more preferably in the range 1:1 to 3:1. The sulfur dioxide can be used as the solvent as well as a reactant, in which case a large molar excess of sulfur dioxide with respect to the unsaturated compound is used and sufficient pressure is employed to maintain the reaction mixture substantially in the liquid phase at the temperature of the reaction.

The product resin according to this invention has an improved thermal stability and retains all the other desirable properties possessed by unsaturated compound-SO₂ resins.

Mixtures of the unsaturated hydrocarbons previously mentioned can be used as well as the pure hydrocarbons; for example, commercially available mixtures of olefins such as refinery cuts can be advantageously employed.

Example I

A series of olefin-SO₂ resins was prepared in a stainless steel autoclave. The recipe employed is shown below and contained a weight ratio of 1-butene to ethyl acrylate of 9 to 1. The other resins were prepared from substantially the same recipe except for the indicated variations in ethyl acrylate content. Except where otherwise indicated, the copolymerized product was coagulated by the use of methanol at a temperature of 140° F.

| Ingredients: | Parts by weight |
|---|---|
| 1-butene | 42.0 |
| Ethyl acrylate | 4.67 |
| Sulfur dioxide | 88.3 |
| Water | 180 |
| Ammonium nitrate | 1.0 |
| Maprofix MM [1] | 2.0 |

[1] Sodium lauryl sulfate dispersing agent commercially available in the form of a paste containing about 60 per cent solids.

The copolymerization was conducted for a time of 7 hours at a temperature of 100° F. A conversion of 89% was obtained. At the end of the reaction period the reactor was opened and excess sulfur dioxide was vented. The reaction mixture was subjected to coagulation as previously described and the resin obtained was filtered, washed and dried.

The 1-butene used in the above runs was a commercial refinery butene fraction comprising 69.9 percent 1-butene and a total of 84.0 percent of unsaturated C₄ hydrocarbons, the remainder being normal and isobutane.

Samples of the resins containing different proportions of ethyl acrylate were tested for thermal stability by heating to approximately 375° F. for different periods of time and measuring the loss of weight. The thermal stability was compared with control resins prepared from recipes which are the same as those previously indicated except for the absence of ethyl acrylate. The results are shown in the following table.

| Resin | Percent Loss in Weight at End of X Hours' Heating at 375±2° F. | | |
|---|---|---|---|
| | ½ | 1 | 3 |
| 90 1-butene/10 ethyl acrylate | 7.0 | 12.8 | 23.8 |
| 100 1-butene/0 ethyl acrylate | 17.6 | 26.0 | 40.9 |
| 80 1-butene blend/20 ethyl acrylate [1] | 5.0 | 11.3 | 22.6 |
| 100 1-butene blend/0 ethyl acrylate [1] | 16.3 | 24.5 | 41.4 |

[1] Resin coagulated with sodium chloride, @ 80° F.

The above data shows a decided improvement in the thermal stability of the resins obtained when ethyl acrylate was used as a component of the recipe in the ratio 10 parts by weight of ethyl acrylate per 90 parts by weight of butene and further improvement was obtained when the ratio of ethyl acrylate to butene was increased to 20:80.

Example II

In a further series of runs conducted as described in Example I, the effect of varying the ethyl acrylate content of the recipe was further studied. The thermal stability tests at approximately 375° F. conducted as described in Example I gave the following data:

| Run | Resin Tested | | Average Percent Decomposition at— | | |
|---|---|---|---|---|---|
| | | | 0.5 hr. | 1.0 hr. | 3.0 hrs. |
| Control | 100% 1-butene [1] | $SO_2$ resin | 15.3 | 22.1 | 36.8 |
| P-153 | 1% Ethyl Acrylate / 99% 1-butene [1] | $SO_2$ resin | 14.9 | 20.1 | 33.1 |
| P-151 | 2% Ethyl Acrylate / 98% 1-butene [1] | $SO_2$ resin | 14.7 | 20.2 | 32.1 |
| P-152 | 5% Ethyl Acrylate / 95% 1-butene [1] | $SO_2$ resin | 9.7 | 14.5 | 24.4 |
| P-98 | 10% Ethyl Acrylate / 90% 1-butene [1] | $SO_2$ resin | 6.4 | 10.6 | 22.4 |

[1] Same 1-butene concentrate as described in Example I.

The above data show that the presence of as little as 1 percent by weight of ethyl acrylate, based on acrylate plus butene, yielded an appreciable improvement in the thermal stability of the resin. Increasing the ethyl acrylate content of the recipe gave further improvement in thermal stability.

Example III

This example shows that methyl, butyl and octyl acrylates as well as ethyl acrylate produce a stabilizing effect on the $SO_2$ resins. The data also show the further stabilizing effect of zinc di-n-hexyl dithiophosphate.

The recipes used in the runs of this example are shown in the following tabulations. The 1-butene blend was the same as that described in Example I and the procedure was the same as that in Example I.

| Ingredient | R-Methyl | R-Ethyl | R-Butyl | R-Octyl |
|---|---|---|---|---|
| R Acrylate [1] parts | 4.3 | 4.7 | 4.8 | 4.8 |
| 1-Butene blend do | 51.2 | 50.1 | 51.7 | 52.0 |
| $SO_2$ do | 98.3 | 98.3 | 99.3 | 98.3 |
| $H_2O$ do | 220 | 220 | 220 | 220 |
| $NH_4NO_3$ do | 1.0 | 1.0 | 1.0 | 1.0 |
| Maprofix MM do | 1.5 | 0.8 | 0.8 | 1.5 |
| Time hours | 6 | 7 | 6 | 6 |
| Temperature ° F | 100 | 100 | 100 | 100 |
| Coagulant | [2] MeOH | NaCl+MeOH | NaCl+MeOH | MeOH |
| Conversion percent | 93 | 72.5 | 82 | 92.5 |

[1] Parts by weight.
[2] Methyl alcohol.

In this series of tests the dithiophosphates were incorporated into the resin by dissolving the dithiophosphate in benzene and adding the solution to the dry powdered resin to provide the concentrations shown. After thoroughly mixing the solution and the resin powder, the benzene was evaporated.

The results of the stability tests on the stabilized and unstabilized resin at approximately 375° F. are shown in the following table:

| $SO_2$ Resin | Percent Loss in Weight at End of X Hours' Heating at 375± 2° F. | | |
|---|---|---|---|
| | 0.5 | 1.0 | 3.0 |
| Control (1-butene blend) | 16.8 | 23.9 | 40.5 |
| 90% blend/10% methyl acrylate | 8.3 | 12.6 | 26.5 |
| 90% blend/10% methyl acrylate + 2% Zn di-n-hexyl dithiophosphate | 1.7 | 2.3 | 6.1 |
| 90% blend/10% ethyl acrylate | 7.9 | 11.1 | 25.7 |
| 90% blend/10% ethyl acrylate + 2% Zn di-n-hexyl dithiophosphate | 1.5 | 2.4 | 6.6 |
| Control (1-butene blend) | 16.6 | 23.7 | 38.8 |
| 90% blend/10% butyl acrylate | 10.8 | 15.1 | 25.3 |
| 90% blend/10% butyl acrylate + 2% Zn di-n-hexyl dithiophosphate | 2.1 | 3.0 | 7.8 |
| 90% blend/10% octyl acrylate | 9.6 | 15.1 | 28.0 |
| 90% blend/10% octyl acrylate + 2% Zn di-n-hexyl dithiophosphate | 1.9 | 3.2 | 10.5 |

Example IV

This example demonstrates the improved moldability of the resins of this invention as compared with unsaturate-$SO_2$ resins which do not contain acrylates. A resin was prepared by the copolymerization of 90 parts by weight of 1-butene with 10 parts by weight of ethyl acrylate and a molecular excess of sulfur dioxide with respect to the two unsaturated compounds. A resin was also prepared from 1-butene and sulfur dioxide. The resins were prepared by emulsion polymerization in a manner similar to that in the foregoing examples. The melt viscosity of the 1-butene-ethyl acrylate-$SO_2$ resin at 350° F. was $3.5 \times 10^6$ poises whereas that of the 1-butene-$SO_2$ resin under the same conditions was $9.6 \times 10^7$ poises. Each of the resins contained 2 weight percent zinc dilauryl dithiophosphate as a stabilizer.

The melt viscosity of the 1-butene-ethyl acrylate-$SO_2$ resin indicates that this resin is more easily molded than the 1-butene-$SO_2$ resin containing no acrylate.

Variation and modification are possible within the scope of the foregoing disclosure and the claims to the invention, the essence of which is that an improved thermally stable resin is obtained by copolymerizing an acrylate, another unsaturated organic compound and sulfur dioxide and recovering resins so produced.

I claim:

1. A heat stable resin comprising a terpolymer of 1-butene with sulfur dioxide and 2 to 10 mol percent of said butene of an alkyl acrylate based on the total 1-butene and alkyl acrylate in which the alkyl group of the acrylate has from 1 to 10 carbon atoms.

2. A heat stable resin comprising a terpolymer of 1-butene with from 2 to 10 mol percent of an alkyl acrylate based on the total of 1-butene and alkyl acrylate in which the alkyl group of the acrylate has from 1 to 10 carbon atoms; and substantially 1 mol of sulfur dioxide per total mols of 1-butene and alkyl acrylate.

3. A resin according to claim 1 in which said acrylate is methyl acrylate.

4. A resin according to claim 1 in which the acrylate is butyl acrylate.

5. A resin according to claim 1 in which the acrylate is octyl acrylate.

6. A resin according to claim 1 in which the acrylate is decyl acrylate.

7. A process which comprises copolymerizing 1-butene with a $C_1$ to $C_{10}$ alkyl acrylate and sulfur dioxide in the presence of a catalyst active for the copolymerization of olefins with sulfur dioxide at a temperature in the range of 0 to 150° F. for a time in the range 1 to 20 hours, the amount of said acrylate being in the range 2 to 10 mol percent based on acrylate plus 1-butene and the molar ratio of sulfur dioxide to 1-butene being in the range 1:1 to 10:1, and recovering a resin of improved thermal stability.

8. A process which comprises copolymerizing 1-butene with sulfur dioxide and an alkyl acrylate having from 1 to 10 carbon atoms in the alkyl group, said acrylate and said 1-butene being emulsified in water, in the presence of a catalyst selected from the group consisting of ammonium nitrate and alkali metal nitrates, said copolymerization being conducted at a temperature in the range 80 to 110° F. and for a time in the range 5 to 8 hours, the amount of acrylate being in the range 2 to 10 mol percent based on acrylate plus 1-butene and the molar ratio of sulfur dioxide to 1-butene being in the range 1:1 to 3:1, and recovering a heat stable resin as a product of the process.

9. The process of claim 8 in which said acrylate is methyl acrylate.

10. The process of claim 8 in which said acrylate is butyl acrylate.

11. The process of claim 8 in which said acrylate is octyl acrylate.

12. The process of claim 8 in which said acrylate is decyl acrylate.

13. A process which comprises copolymerizing 1-butene, ethyl acrylate and sulfur dioxide at a temperature in the range 80 to 110° F. and for a time in the range 5 to 8 hours, said butene and said acrylate being dispersed in water, the amount of said acrylate being in the range 2 to 10 mol percent based on acrylate plus butene, the mol ratio of $SO_2$ to 1-butene being approximately 2 to 1, adding a coagulant selected from the group consisting of methyl alcohol and sodium chloride, separating a coagulated resin, washing and drying said resin, and recovering said resin as a product of the process.

References Cited in the file of this patent
UNITED STATES PATENTS

| | | |
|---|---|---|
| 2,146,276 | Wilder | Feb. 7, 1939 |
| 2,192,467 | Frey | Mar. 5, 1940 |
| 2,703,793 | Naylor | Mar. 8, 1955 |